United States Patent
Saruwatari et al.

(10) Patent No.: US 8,568,926 B2
(45) Date of Patent: *Oct. 29, 2013

(54) NON-AQUEOUS ELECTROLYTE BATTERY

(71) Applicants: Hidesato Saruwatari, Kawasaki (JP); Hideaki Morishima, Saku (JP); Hiroki Inagaki, Kawasaki (JP); Norio Takami, Yokohama (JP)

(72) Inventors: Hidesato Saruwatari, Kawasaki (JP); Hideaki Morishima, Saku (JP); Hiroki Inagaki, Kawasaki (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/679,316

(22) Filed: Nov. 16, 2012

(65) Prior Publication Data

US 2013/0078531 A1     Mar. 28, 2013

Related U.S. Application Data

(63) Continuation of application No. 12/338,167, filed on Dec. 18, 2008.

(30) Foreign Application Priority Data

Dec. 27, 2007    (JP) .................................. 2007-337801

(51) Int. Cl.
*H01M 4/13*     (2010.01)
*H01M 6/08*     (2006.01)
*H01M 6/10*     (2006.01)

(52) U.S. Cl.
USPC ...... 429/231.95; 429/221; 429/223; 429/224; 429/231.3; 429/231.8; 429/307; 429/331

(58) Field of Classification Search
USPC .............. 429/231.95, 231.5, 231.8, 223, 224, 429/231.3, 221, 188, 307, 331
See application file for complete search history.

(56) References Cited

U.S. PATENT DOCUMENTS

| | | | |
|---|---|---|---|
| 6,544,682 B1 | 4/2003 | Takami et al. | |
| 6,821,677 B2 * | 11/2004 | Inagaki et al. | ............... 429/221 |
| 7,572,553 B2 | 8/2009 | Ohkubo et al. | |
| 7,662,515 B2 | 2/2010 | Inagaki et al. | |
| 8,039,151 B2 | 10/2011 | Inagaki et al. | |
| 2005/0079417 A1 | 4/2005 | Kim et al. | |
| 2008/0032192 A1 | 2/2008 | Yokomizo et al. | |
| 2008/0241692 A1 | 10/2008 | Saruwatari et al. | |

FOREIGN PATENT DOCUMENTS

JP     2007-18882     1/2007

* cited by examiner

*Primary Examiner* — Ula C. Ruddock
*Assistant Examiner* — Thomas H. Parsons
(74) *Attorney, Agent, or Firm* — Oblon, Spivak, McClelland, Maier & Neustadt, L.L.P.

(57) ABSTRACT

A non-aqueous electrolyte battery includes an electrode group includes a positive electrode and a negative electrode disposed through a separator, and a non-aqueous electrolyte. The negative electrode comprises a current collector and a porous negative electrode layer formed on the current collector and containing a lithium compound. The porous negative electrode layer has a first peak at a pore diameter of 0.04 to 0.15 μm and a second peak at a pore diameter of 0.8 to 6 μm in the relation between the pore diameter and log differential intrusion obtained in the mercury press-in method.

11 Claims, 2 Drawing Sheets

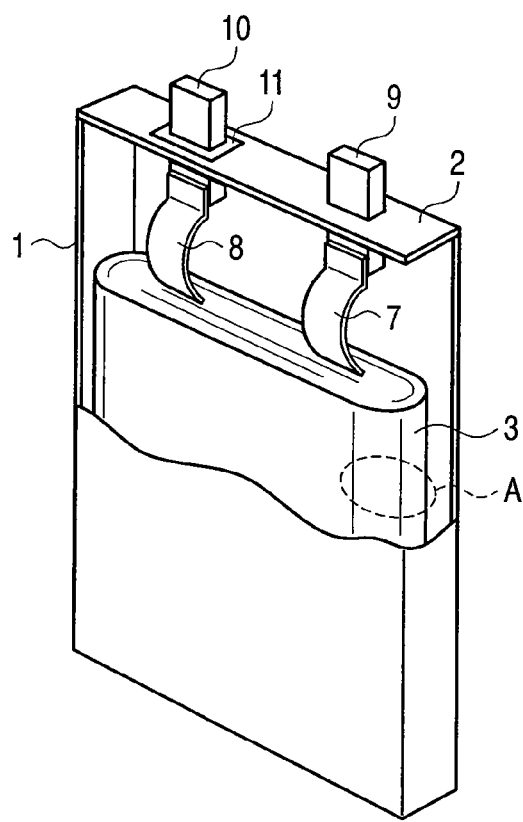
F I G. 1
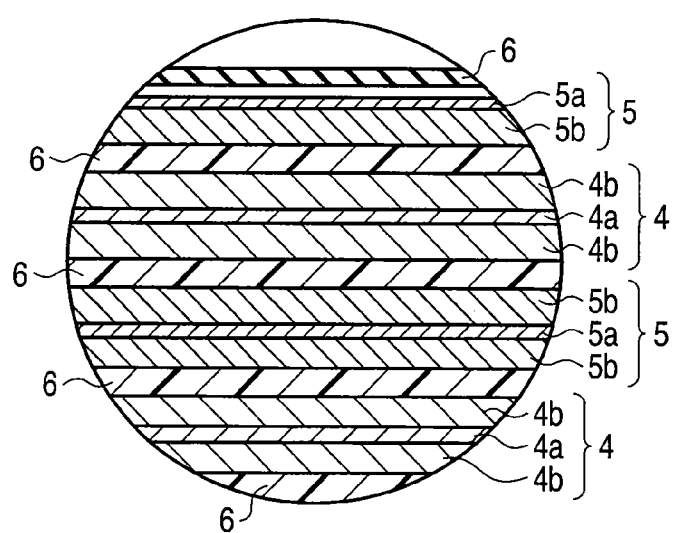
F I G. 2

NON-AQUEOUS ELECTROLYTE BATTERY

CROSS-REFERENCE TO RELATED APPLICATIONS

This application is a continuation of U.S. application Ser. No. 12/338,167 filed Dec. 18, 2008, and is based upon and claims the benefit of priority from prior Japanese Patent Application No. 2007-337801, filed Dec. 27, 2007, the entire contents of each of which are incorporated herein by reference.

BACKGROUND OF THE INVENTION

1. Field of the Invention

The present invention relates to a non-aqueous electrolyte battery.

2. Description of the Related Art

JP-A 2007-18882 (KOKAI) discloses that the conditions of materials and particles in the electrodes of a battery are grasped based on the measurement of pore distribution (particularly, the measurement of pore distribution in an area of a size smaller than 0.2 μm) of the electrode materials and battery electrode according to the mercury press-in method, thereby improving the performance of the battery.

BRIEF SUMMARY OF THE INVENTION

According to the present invention, there is provided a non-aqueous electrolyte battery comprising: an electrode group comprising a positive electrode, a negative electrode and a separator disposed between the positive electrode and negative electrode; and a non-aqueous electrolyte, wherein the negative electrode comprises a current collector and a porous negative electrode layer formed on the current collector and containing a lithium compound as an active material, and the porous negative electrode layer has a first peak at a pore diameter of 0.04 to 0.15 μm and a second peak at a pore diameter of 0.8 to 6 μm in the relation between the pore diameter and log differential intrusion obtained in the mercury press-in method.

BRIEF DESCRIPTION OF THE SEVERAL VIEWS OF THE DRAWING

FIG. 1 is a partly broken side view showing an example of a non-aqueous electrolyte battery according to an embodiment of the present invention;

FIG. 2 is an enlarged sectional view of the part A of FIG. 1;

DETAILED DESCRIPTION OF THE INVENTION

Figure 3:
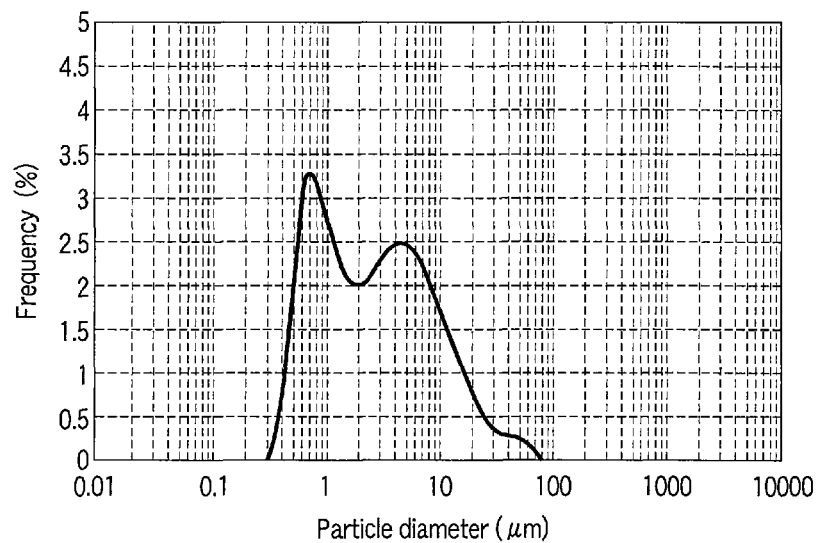
FIG. 3 is a view showing the grain distribution of a slurry used in Example 1, the grain distribution being measured by a laser grain distribution measuring device.

A non-aqueous electrolyte battery according to an embodiment of the present invention will be explained in detail.

The non-aqueous electrolyte battery according to this embodiment is provided with an electrode group including a positive electrode and a negative electrode which are disposed with a separator interposed therebetween, and a non-aqueous electrolyte.

The negative electrode comprises a current collector and a porous negative electrode layer formed on one or both surfaces of the current collector and containing a lithium compound as the active material and further a binder, and as required, a conductive agent. The porous negative electrode layer has a first peak at a pore diameter of 0.04 to 0.15 μm and a second peak at a pore diameter of 0.8 to 6 μm in the relation between pore diameter and log differential intrusion which are obtained by the mercury press-in method. In this case, it is preferable for the first peak to appear at a pore diameter of 0.07 to 0.12 μm and the second peak to appear at a pore diameter of 1 to 3 μm.

Here, the measurement of the pore diameter distribution by using the mercury press-in method will be explained. The negative electrode is cut into a size of 50 mm×50 mm to prepare three samples, of which the distributions of pore diameter are measured by the mercury press-in method to calculate an average of the measured values as the value of the distribution of pore diameter to be measured. At this time, the weight used for measuring the pore diameter distribution is the weight of the negative electrode excluding the current collector, i.e. the weight of the porous negative electrode layer.

The relation between the pore diameter and log differential intrusion means a value obtained by logarithmic differentiation of the relation between the pore diameter and log differential intrusion which are obtained by the mercury press-in method. When the pore diameter is D and the pore volume is V, the log differential intrusion is given by $-dV/d(\log D)$. Accordingly, the relation of the pore diameter and log differential intrusion is almost equal to the relative frequency distribution curve of particle diameters in the case of a powder.

The ratio of H2/H1 is preferably $1\times10^{-5}$ or more and 0.5 or less, where H1 is the height of the first peak and H2 is the height of the second peak. If the ratio of H2/H1 is less than $1\times10^{-5}$, this makes it difficult to improve the penetrability of the non-aqueous electrolyte solution into the negative electrode layer. If the ratio of H2/H1 exceeds 0.5, there is a fear as to a reduction in output characteristics though the non-aqueous electrolyte solution can be sufficiently penetrated into the negative electrode layer. The ratio of H2/H1 is more preferably $1\times10^{-3}$ or more and 0.2 or less.

Examples of the lithium compound contained in the negative electrode layer include a lithium oxide, lithium sulfide and lithium nitride. These lithium compounds include compounds which can hold lithium when charged, but cannot when uncharged.

As the lithium oxide, for example, titanium-containing metal oxides, amorphous tin oxides such as $SnB_{0.4}P_{0.6}O_{3.1}$, tin-silicon oxides such as $SnSiO_3$, silicon oxides such as $SiO$ and tungsten oxides such as $WO_3$ may be used. Among these compounds, titanium-containing metal composite oxides are preferable.

The titanium-containing metal oxides are, for example, lithium-titanium oxides and titanium type oxides containing no lithium when synthesized. Examples of the lithium-titanium oxides include lithium titanate having a spinel structure and lithium titanate having a ramsdellite structure. The above lithium titanate having a spinel structure is, for example, $Li_{4+x}Ti_5O_{12}$ (x varies within the following range: $-1\leq x\leq 3$, depending on a charge-discharge reaction). The above lithium titanate having a ramsdellite structure is, for example, $Li_{2+y}Ti_3O_7$ (y varies within the following range: $-1\leq y\leq 3$, depending on a charge-discharge reaction). As the titanate type oxide, $TiO_2$ and metal composite oxides containing Ti and at least one element selected from the group consisting of P, V, Sn, Cu, Ni and Fe may be used. $TiO_2$ is preferably one which is an anatase type and has less crystalline under heat treatment at 300 to 500° C. As the metal composite oxides containing Ti and at least one element selected from the group consisting of P, V, Sn, Cu, Ni and Fe, for example, $TiO_2$—$P_2O_5$, $TiO_2$—$V_2O_5$, $TiO_2$—$P_2O_5$—$SnO_2$ and $TiO_2$—$P_2O_5$—MeO (Me is at least one element selected from the group consisting of Cu, Ni and Fe) may be used. This metal composite oxide preferably has low crystallinity and also has a microstructure in which a crystal phase and an amorphous phase coexist or an amorphous phase singly exists. The metal composite oxide having such a microstructure makes possible to significantly improve cycle performance. Among these metal composites, lithium-titanium oxides and metal composite oxides containing Ti and at least one element selected from the group consisting of P, V, Sn, Cu, Ni and Fe are preferable. In the metal composite oxide, the molar ratio of oxygen varies due to the influence of, for example, oxygen non-stoichiometry.

Examples of the sulfide include titanium sulfides such as $TiS_2$, molybdenum sulfides such as $MoS_2$ and iron sulfides such as FeS, $FeS_2$ and $Li_xFeS_2$.

Examples of the nitrides include lithium-cobalt nitrides (for example, $Li_xCo_yN$, where $0<x\leq4$, and $0<y\leq0.5$).

Among these active materials, particularly those containing at least one compound selected from lithium titanate such as $Li_{4+x}Ti_5O_{12}$ having a spinel structure, FeS and $FeS_2$ are preferable, and the most preferable active material is lithium titanate having a spinel structure.

As the binder, for example, a polytetrafluoroethylene (PTFE), polyvinylidene fluoride (PVdF), fluorine type rubber and styrene butadiene rubber may be used.

As the conductive agent to be formulated according to need, for example, carbon black such as acetylene black and high electrical conductive carbon black such as KETJEN BLACK (trade name), graphite, coke, carbon fibers and metal powder may be used. Particularly, carbon fibers having an aspect ratio of 10 to 10000 are preferably used as the conductive agent. Here, the aspect ratio means the ratio (L1/L2) of the axis length L1 of the carbon fiber to the maximum length L2 of the section of the carbon fiber which makes a right angle with this axis. The use of such carbon fibers as the conducting agent makes it possible to limit the coagulation of a slurry used in the production of the negative electrode which will be explained later. This is because when carbon fibers having a large aspect ratio are present between the active material particles, the coagulation of the active material particles can be made to act as a steric hindrance. However, it is difficult to make the desired slurry merely by use of carbon fibers, and it is therefore preferable to adopt the dispersing method carried out by beads-milling using zirconia beads 0.2 µm or less in diameter, as described later.

The proportions of the active material, binder and conductive agent are preferably as follows: the active material is in a range from 73 to 98% by weight, the binder is in a range from 2 to 7% by weight and the conductive agent is in a range from 0 to 20% by weight based on the total amount of the active material, binder and conductive agent.

The current collector is preferably made of an aluminum foil or an aluminum alloy foil. The current collector preferably has an average crystal particle diameter of 50 µm or less. Because the current collector having such an average crystal particle diameter can be outstandingly increased in strength, the negative electrode can be highly densified by pressing under a high pressure, whereby the capacity of the battery can be increased. Also, because the above current collector can be prevented from being dissolved and from being deteriorated by corrosion, a rise in the impedance of the negative electrode can be limited in an overcharge cycle under a high-temperature environment (40° C., or more). Moreover, this current collector can also improve the output characteristics, rapid charging and charge-discharge cycle characteristics. The average crystal particle diameter is more preferably 30 µm or less and even more preferably 0.1 to 5 µm.

The average crystal particle diameter is found in the following manner. The tissue of the surface of the current collector is observed by an optical microscope to measure the number n of crystal particles existing in an area of 1 mm×1 mm. Using the obtained n, the average crystal particle area S is calculated from the equation: $S=1\times10^6/n$ (µm$^2$). Using the obtained S, the average crystal particle diameter d (µm) is calculated from the following equation (A).

$$d=2(S/\pi)^{1/2} \qquad (A)$$

The thickness of the aluminum foil or aluminum alloy foil is preferably 20 µm or less and more preferably 15 µm or less. The purity of the aluminum foil is preferably 99 wt. % or more. The aluminum alloy is preferably an alloy containing an element such as magnesium, zinc and silicon. The content of transition metals such as iron, steel, nickel and chromium contained in this alloy is preferably made to be 1 wt % by weight or less.

Next, a method of producing a negative electrode having the above characteristics will be explained.

The active material, the binder, and as required, the conductive agent are suspended in an appropriate solvent to form a slurry, and then the slurry being applied to a current collector such as an aluminum foil, followed by drying and pressing to manufacture a band-like negative electrode.

In the production of the slurry, the slurry has such a distribution of grain size, when measured by a laser grain size distribution measuring device, that it has a peak at a grain size of 0.3 to 2 µm and a peak at a grain size exceeding 2 µm (preferably 3 µm or more) and less than 10 µm, and the relation: $0.2\leq(b/a)\leq1.0$ is established between the maximum frequency (a) in the range from 0.3 to 2 µm and the maximum frequency (b) in the range exceeding 2 µm (preferably 3 µm or more) and less than 10 µm. For the preparation of the slurry having a distribution peak at a grain size of 0.3 to 2 µm, it is necessary to use an active material having an average particle diameter range from 0.3 to 2 µm. When particles having an average particle diameter as small as 0.3 to 2 µm are suspended in a proper solvent, these particles coagulate in the slurry. Because it is difficult to avoid this coagulation by the usual kneading or dispersing operation, the above value of (b/a) exceeds 1.0. Therefore, a low impact is applied primarily to the active material particles when the slurry is prepared in this embodiment, thereby enabling coagulation to be avoided (eliminated). When the slurry is prepared, bead-milling using zirconia beads 0.2 µm or less in diameter may be carried out to obtain a slurry having the aforementioned intended distribution of grain size. The use of such a slurry enables the production of a negative electrode having a negative electrode layer which has a first peak at a pore diameter of 0.04 to 0.15 µm and a second peak at a pore diameter of 0.8 to 6 lam in the relation between the pore diameter and log differential intrusion obtained in the mercury press-in method, whereby a non-aqueous electrolyte battery superior in output characteristics can be obtained.

Next, explanations will be furnished as to the structural members of the non-aqueous electrolyte battery except for the negative electrode.

1) Positive Electrode

The positive electrode comprises a current collector and a positive electrode layer formed on one or both surfaces of the current collector and containing the active material, conductive agent and binder.

The positive electrode is manufactured, for instance, by suspending the active material, the conductive agent and the binder in a proper solvent to prepare a slurry, and then the slurry being applied to a current collector such as an aluminum foil, followed by drying and pressing.

As the active material, various oxides and sulfides may be used. Examples of the active material include manganese dioxide ($MnO_2$), iron oxide, copper oxide, nickel oxide, lithium-manganese composite oxides (for example, $Li_xMn_2O_4$ or $Li_xMnO_2$), lithium-nickel composite oxides (for example, $Li_xNiO_2$), lithium-cobalt composite oxides (for example, $Li_xCoO_2$), lithium-nickel-cobalt composite oxides (for example, $LiNi_{1-y-z}Co_yM_zO_2$, where M is at least one element selected from the group consisting of Al, Cr and Fe, and y and z are $0 \leq y \leq 0.5$ and $0 \leq z \leq 0.1$, respectively), lithium-manganese-cobalt composite oxides (for example, $LiMn_{1-y-z}Co_yM_zO_2$, where M is at least one element selected from the group consisting of Al, Cr and Fe, and x and z are $0 \leq y \leq 0.5$ and $0 \leq z \leq 0.1$, respectively), lithium-manganese-nickel composite oxides (for example, $LiMn_xNi_xM_{1-2x}O_2$, where M is at least one element selected from the group consisting of Co, Cr, Al and Fe, and x is $\frac{1}{3} \leq xx \leq \frac{1}{2}$; $LiMn_{1/3}Ni_{1/3}Co_{1/3}O_2$ and $LiMn_{1/2}Ni_{1/2}O_2$), spinel type lithium-manganese-nickel composite oxides ($Li_xMn_{2-y}Ni_yO_4$), lithium-phosphorous oxides having an olivine structure (for example, $Li_xFePO_4$, $Li_xFe_{1-y}Mn_yPO_4$ and $Li_xCoPO_4$), iron sulfate ($Fe_2(SO_4)_3$) and vanadium oxide (for example, $V_2O_5$). Also, organic materials and inorganic materials including conductive polymer materials such as a polyaniline and polypyrrole, disulfide type polymer materials, sulfur (S) and carbon fluoride may be used. In the above formulae, x and y preferably satisfy the following equations: $0<x \leq 1$ and $0 \leq y \leq 1$, unless otherwise noted.

More preferable examples of the active material include lithium-manganese composite oxides, lithium-nickel composite oxides, lithium-cobalt composite oxides, lithium-nickel-cobalt composite oxides, lithium-manganese-nickel composite oxides, spinel type lithium-manganese-nickel composite oxides, lithium-manganese-cobalt composite oxides and lithium iron phosphate. A high-voltage non-aqueous electrolyte battery may be obtained by using these active materials.

As the conductive agent, for example, acetylene black, KETJEN BLACK, graphite and cokes may be used.

As the binder, for example, a polytetrafluoroethylene (PTFE), polyvinylidene fluoride (PVdF) and fluorine type rubber may be used.

The proportions of the active material, the conductive agent and the binder are preferably in the following ranges: active material: 73 to 96% by weight, conductive agent: 2 to 20% by weight and binder: 2 to 7% by weight based on the total amount of the active material, the conductive agent and the binder.

The current collector is preferably formed of an aluminum foil or an aluminum alloy foil. The average crystal particle diameter of the aluminum foil or aluminum alloy foil is preferably 50 μm or less, more preferably 30 μm or less and even more preferably 5 μm or less. When the average crystal particle diameter is designed to be 50 μm or less, the strength of the aluminum foil or aluminum alloy foil can be outstandingly increased, and therefore, the positive electrode can be highly densified using a high pressing pressure, leading to an increase in battery capacity. The average crystal particle diameter may be found by the same method as that described in the above explanations of the negative electrode.

The average crystal particle diameter of the aluminum foil or aluminum alloy foil varies owing to the complicated influences of plural factors such as the organization of the materials, impurities, processing condition, heat treating history and annealing condition. The crystal particle diameter may be controlled by a proper combination of the above various factors in the process of producing the current collector.

The thickness of the aluminum foil or aluminum alloy foil is 20 μl or less and more preferably 15 μm or less. The purity of the aluminum foil is preferably 99% or more. The aluminum alloy is preferably one containing an element such as magnesium, zinc and silicon. In the case of containing transition metals such as iron, copper, nickel and chromium in the above alloy, on the other hand, the content of these transition metals is preferably 1% by weight or less.

2) Nonaqueous Electrolyte

This non-aqueous electrolyte contains a non-aqueous solvent and an electrolytic salt to be dissolved in the non-aqueous solvent. Also, the non-aqueous solvent may contain a polymer.

Examples of the electrolytic salt include lithium salts such as $LiPF_6$, $LiBF_4$, $Li(CF_3SO_2)_2N$ (lithium bistrifluoromethanesulfonylamide; common name: LiTFSI), $LiCF_3SO_3$ (common name: LiTFS), $Li(C_2F_5SO_2)_2N$ (lithium bispentafluoromethanesulfonylamide; common name: LiBETI), $LiClO_4$, $LiAsF_6$, $LiSbF_6$, lithium bisoxalate borate ($LiB(C_2O_4)_2$, common name: LiBOB) and lithium difluoro (trifluoro-2-oxide-2-trifluoro-methylpropionate(2-)-0,0)borate ($LiBF_2(OCOOC(CF_3)_2$, common name: $LiBF_2(HHIB)$. These electrolytic salts may be used either singly or in combinations of two or more. Particularly, $LiPF_6$ and $LiBF_4$ are preferable.

The concentration of the electrolytic salt is preferably 1.5 mol/L or more and 3 mol/L or less. The limitation to the concentration of the electrolyte enables the performance of the battery when a high-load current is made to flow to be further improved while suppressing the influence of the increase in viscosity caused by a rise in the concentration of the electrolytic salt.

As the non-aqueous solvent, propylene carbonate (PC), ethylene carbonate (EC), 1,2-dimethoxyethane (DME), γ-butyrolactone (GBL), tetrahydrofuran (THF), 2-methyltetrahydrofuran (2-MeHF), 1,3-dioxolan, sulfolane, acetonitrile (AN), diethyl carbonate (DEC), dimethyl carbonate (DMC), methyl ethyl carbonate (MEC) and dipropyl carbonate (DPC) may be used, though no particular limitation is imposed on it. These solvents may be used either singly or in combinations of two or more. Among these solvents, γ-butyrolactone is preferable. Also, when two or more solvents are combined, all of the solvents are preferably selected from those having a dielectric constant of 20 or more.

An additive may be added to the non-aqueous electrolyte. Examples of the additive include, though are not limited to, vinylene carbonate (VC), vinylene acetate (VA), vinylene butyrate, vinylene hexanate, vinylene crotonate and catechol carbonate. The concentration of the additive is preferably 0.1% by weight or more and 3% by weight or less and more preferably 0.5% by weight or more and 1% by weight or less in terms of external percentage based on the non-aqueous electrolyte.

3) Separator

As the separator, a porous film or nonwoven fabric obtained from a polymer such as a polyolefin, cellulose, polyethylene terephthalate and vinylon is used. Here, the material of the separator is selected from single materials or combinations of two or more materials. Particularly, a nonwoven fabric made of any one of a polyolefin, cellulose, polyethylene terephthalate and vinylon is preferable. As mentioned above, an electrode having pores 0.04 to 0.2 μm in diameter is resistant to penetration of the non-aqueous electrolyte solution. In a non-aqueous electrolyte battery, a non-aqueous electrolyte solution penetrates the separator and the electrode in this order. The use of such a nonwoven fabric made from any one of a polyolefin, cellulose, polyethylene terephthalate and vinylon, the pores of which are large and through which the electrolyte solution easily penetrates, as a separator enables the promotion of the penetration of the electrolyte solution, thereby useful to improve the output characteristics.

The non-aqueous electrolyte battery according to the embodiment, for example, an angular type non-aqueous electrolyte battery, will be explained in detail with reference to FIGS. 1 and 2. FIG. 1 is a partly broken perspective view showing an example of the non-aqueous electrolyte battery according to the embodiment, and FIG. 2 is an enlarged sectional view of the A part of FIG. 1.

An aluminum rectangular lid 2 is attached to an opening of a bottomed rectangular cylinder 1 made of, for example, aluminum. A flat electrode group 3 is received in the bottomed rectangular cylinder 1. As shown in FIG. 2, the electrode group 3 is manufactured by coiling a positive electrode 4 and a negative electrode 5 having the aforementioned characteristics spirally such that a separator 6 is sandwiched between these electrodes and is disposed on the outside peripheral surface and by press-molding the coiled electrodes. The positive electrode 4 is constituted of, for example, a current collector 4a and a positive electrode layer 4 formed on both surfaces of the current collector 4a. A positive electrode lead tab 7 is integrally connected with the current collector 4a of the positive electrode 4. The negative electrode 5 is constituted of, for example, a current collector 5a and a negative electrode layer 5b which is formed on both surfaces of the current collector 5a, and has a first peak at a pore diameter of 0.04 to 0.15 µm and a second peak at a pore diameter of 0.8 to 6 µm in the relation between the pore diameter and log differential intrusion obtained in the above mercury press-in method. A negative electrode lead tab 8 is integrally connected with the current collector 5a. The non-aqueous electrolyte solution is received in the bottomed rectangular cylinder 1.

For example, a plate-like positive electrode terminal 9 is inserted into the lid 2. A positive electrode lead tab 7 is connected to the vicinity of the end of the positive electrode terminal 9 positioned in the bottomed rectangular cylinder 1. For example, a plate-like negative electrode terminal 10 is inserted into the lid 2 by hermetic seal using a glass material 11. The negative electrode lead tab 8 is connected to the vicinity of the negative electrode terminal 10 positioned in the bottomed rectangular cylinder 1. In this case, the negative electrode terminal 10 may be inserted into the lid 2 through a resin by caulking.

According to the embodiment mentioned above, the porous negative electrode layer of the negative electrode has a first peak at a pore diameter of 0.04 to 0.15 µm and a second peak at a pore diameter of 0.8 to 6 µm in the relation between the pore diameter and log differential intrusion obtained in the mercury press-in method, and therefore it is possible to obtain a non-aqueous electrolyte battery significantly improved in output characteristics.

The negative electrode layer containing a lithium compound as the active material has a lower conductivity than a negative electrode layer containing carbon as the active material. It is therefore necessary for the former negative electrode layer to have a peak at a pore diameter of 0.04 to 0.15 µm in the relation between the pore diameter and log differential intrusion obtained in the mercury press-in method. In other words, it is necessary that many pores having a small diameter are present in the negative electrode layer to increase the specific surface area of the negative electrode layer, thereby increasing the contact area of the negative electrode layer with the non-aqueous electrolyte (non aqueous electrolyte solution). However, the negative electrode layer having a peak at a pore diameter of 0.04 to 0.15 µm has difficulty in sufficient impregnation with the non-aqueous electrolyte solution.

Due to the above reason, the porous negative electrode layer of the negative electrode used in this embodiment has not only a first peak at a pore diameter of 0.04 to 0.15 µm but also a second peak at a pore diameter of 0.8 to 6 µm in the relation between the pore diameter and log differential intrusion obtained in the mercury press-in method. The impregnation of the negative electrode layer with the non-aqueous electrolyte solution can be promoted by making the negative electrode layer have a second peak at a pore diameter as relatively large as 0.8 to 6 µm. Thus, a non-aqueous electrolyte battery outstandingly improved in output characteristics can be obtained.

The present invention will be explained in detail by way of examples with reference to the drawings.

Example 1

Production of a Positive Electrode

Using $LiCoO_2$ as a positive electrode active material, it was formulated with a graphite powder as a conductive agent in an amount of 8% by weight and with PVdF as a binder in an amount of 5% by weight based on the total weight of the positive electrode. The mixture was dispersed in an n-methylpyrrolidone (NMP) solvent to prepare a slurry. This slurry was applied to an aluminum foil having a thickness of 15 µm and then subjected to drying and pressing processes to manufacture a positive electrode having an electrode density of 3.3 $g/cm^3$.

<Production of a Negative Electrode>

Using $Li_4Ti_5O_{12}$ as a negative electrode active material, it was formulated with graphite in an amount of 8% by weight and carbon fibers having an aspect ratio of 200 in an amount of 2% by weight as a conductive agent and with PVdF as a binder in an amount of 3% by weight based on the total weight of the negative electrode. The mixture was dispersed in an n-methylpyrrolidone (NMP) solvent to prepare a slurry. In this case, the solid content ratio (weight of the solid/total weight of the slurry) of the slurry was made to be 40% and for the dispersion, bead-milling was carried out using zirconia beads 0.1 mm in diameter. The distribution of grain size of the obtained slurry measured by a laser particle size distribution measuring device is shown in FIG. 3. As is clear from FIG. 3, peaks appeared at particle diameters of 0.72 µm and 3.8 µm in the distribution of particle size, and the ratio (b/a) of the maximum frequency (a) at a particle diameter of 0.72 µm to the maximum frequency (b) at a particle diameter of 3.8 µm was 0.64.

The obtained slurry was applied to a current collector constituted of an aluminum foil having a thickness of 15 µm, followed by drying and pressing to manufacture a negative electrode having an electrode density of 2.1 $g/cm^3$.

Figure 4:
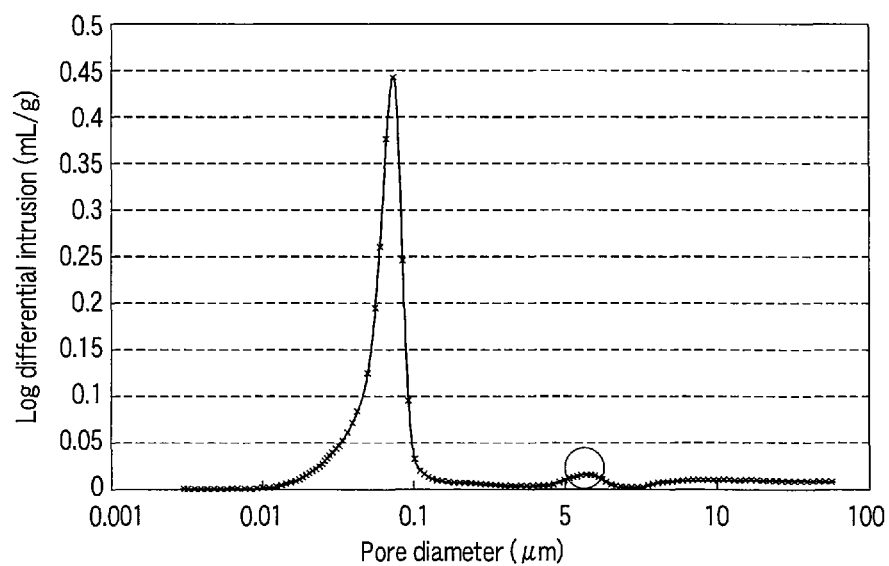
FIG. 4 is a view showing the relation between the pore diameter and log differential intrusion of a negative electrode obtained in Example 1.

FIG. 4 is a view showing the relation between the pore diameter and log differential intrusion by the mercury press-in method of the obtained negative electrode layer of the negative electrode. As shown in FIG. 4, a first peak appeared at a pore diameter of 0.088 µm and a second peak appeared at a pore diameter of 2.2 µm. When the height of the first peak was H1 and the height of the second peak was H2, the ratio of these peak heights (H2/H1) was 0.12.

<Preparation of a Non-Aqueous Electrolyte>

2 M of $LiBF_4$ was mixed in a mixture solvent consisting of EC, PC and GBL which are volume ratio of 1:1:4 to prepare a non-aqueous electrolyte.

<Fabrication of a Battery>

A separator made of a cellulose nonwoven fabric was impregnated with the above non-aqueous electrolyte. Then, the positive electrode was covered with this separator and the negative electrode was overlapped so as to face the positive electrode with the separator being interposed therebetween. Then, these electrodes were coiled spirally to manufacture a spiral electrode group. This electrode group was subjected to pressing to mold it into a flat form. The electrode group molded into a flat form was inserted into a bottomed rectangular cylinder made of aluminum and having a thickness of 0.3 mm to produce an angular non-aqueous electrolyte battery having a thickness of 3.0 mm, a width of 35 mm and a height of 65 mm shown in FIG. 1.

Example 2

A negative electrode was manufactured in the same manner as in Example 1 except that graphite was used as the conductive agent in an amount of 10% by weight based on the total weight of the negative electrode layer and further, a non-aqueous electrolyte battery was manufactured by incorporating the negative electrode thereinto was produced. With regard to the negative electrode layer of the manufactured negative electrode, a first peak appeared at a pore diameter of 0.086 μm and a second peak appeared at a pore diameter of 2.4 μm in the relation between the pore diameter and log differential intrusion by the mercury press-in method. When the height of the first peak was H1 and the height of the second peak was H2, the ratio of these peak heights (H2/H1) was 0.08.

Example 3

A non-aqueous electrolyte battery was manufactured in the same manner as in Example 1 except that a polyethylene porous film was used as the separator.

Comparative Example 1

A negative electrode was manufactured in the same manner as in Example 1 except that the solid ratio of the slurry was changed to 60% and the dispersing treatment was carried out by a bead mill using zirconia beads 1.0 mm in diameter instead of using zirconia beads 0.1 mm in diameter and further, a non-aqueous electrolyte battery into which the negative electrode was incorporated was produced. With regard to the negative electrode layer of the manufactured negative electrode, a peak appeared only at a pore diameter of 0.12 μm and no peak appeared at a pore diameter range from 0.8 to 3 μm in the relation between the pore diameter and log differential intrusion by the mercury press-in method.

Each of the obtained non-aqueous electrolyte batteries in Examples 1 to 3 and Comparative Example 1 was discharged under a current of 1 C and a current of 5 C for 10 seconds in a 50%-charged state to detect the terminal voltage from which a current value when the battery voltage reached 1.5 V after 10 seconds was found by the extrapolation method. From the current value, the power value was calculated respectively. The results are shown in the following Table 1.

TABLE 1

Negative electrode characteristics (relation between the pore diameter and the log differential intrusion)

| | Pore diameter at which a first peak appears | Pore diameter at which a second peak appears | Ratio of the second peak height H2 to the first peak height H1 [H2/H1] | Power value (W) |
|---|---|---|---|---|
| Example 1 | 0.088 μm | 2.2 μm | 0.12 | 185 |
| Example 2 | 0.086 μm | 2.4 μm | 0.08 | 170 |
| Example 3 | 0.088 μm | 2.2 μm | 0.12 | 168 |
| Comparative Example 1 | 0.12 μm | None | — | 130 |

As is clear from the above Table 1, it is found that the non-aqueous electrolyte batteries of Examples 1 to 3, which comprise the negative electrode having a negative electrode layer with a first peak at a pore diameter of 0.04 to 0.15 μm and a second peak at a pore diameter of 0.8 to 6 μm in the relation between the pore diameter and log differential intrusion obtained in the mercury press-in method, have a higher power value than the non-aqueous electrolyte battery of Comparative Example 1, which comprises the negative electrode having a negative electrode layer with a peak only at a pore diameter of 0.04 to 0.15 μm in the relation between the pore diameter and log differential intrusion obtained in the mercury press-in method.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A non-aqueous electrolyte battery comprising:
   an electrode group comprising a positive electrode, a negative electrode and a separator disposed between the positive electrode and negative electrode; and
   a non-aqueous electrolyte,
   wherein the negative electrode comprises a current collector and a porous negative electrode layer formed on the current collector and containing lithium compound particles as an active material and binder,
   a distribution of grain size in the lithium compound particles has a peak at a grain size of 0.3 to 2 μm and a peak at a grain size exceeding 2 μm and less than 10 μm, and the relation: $0.2 \leq (b/a) \leq 1.0$ is established between the maximum frequency (a) in the range from 0.3 to 2 μm and the maximum frequency (b) in the range exceeding 2 μm and less than 10 μm,
   the binder contains 2 to 7% by weight of porous negative electrode layer,
   the porous negative electrode layer has pores at least in the binder and between lithium compound particles and the binder,
   the pores in the porous negative electrode layer are distributed such that a distribution has a first peak at a pore diameter of 0.04 to 0.15 μm and a second peak at a pore diameter of 0.8 to 6 μm in the relation between the pore diameter and log differential intrusion obtained in the mercury press-in method, and
   the non-aqueous electrolyte comprises at least one electrolytic salt selected from the group consisting of $LiPF_6$, LiBF$_4$, Li(CF$_3$SO$_2$)$_2$, LiCF$_3$SO$_3$, Li(C$_2$F$_5$SO$_2$)$_2$N, LiClO$_4$, LiAsF$_6$, LiSbF$_6$, LiB(C$_2$O$_4$)$_2$ and LiBF$_2$(OCOOC(CF$_3$)$_2$)$_2$, and at least one non-aqueous solvent selected from the group consisting of propylene carbonate (PC), ethylene carbonate (EC), 1,2-dimethoxyethane (DME), γ-butyrolactone (GBL), tetrahydrofuran (THF), 2-methyltetrahydrofuran (2-MeHF), 1,3-dioxolan, sulfolane, acetonitrile (AN), diethyl carbonate (DEC), dimethyl carbonate (DMC), methyl ethyl carbonate (MEC) and dipropyl carbonate (DPC).

2. The battery according to claim 1, wherein the first peak appears at a pore diameter of 0.07 to 0.12 μm and the second peak appears at a pore diameter of 1 to 3 μm.

3. The battery according to claim 1, wherein the ratio of H2/H1 is $1 \times 10^{-5}$ or more and 0.5 or less, where H1 is the height of the first peak and H2 is the height of the second peak.

4. The battery according to claim 1, wherein the ratio of H2/H1 is $1 \times 10^{-3}$ or more and 0.2 or less, where H1 is the height of the first peak and H2 is the height of the second peak.

5. The battery according to claim 1, wherein the lithium compound particles are lithium-titanium composite oxide particles.

6. The battery according to claim 1, wherein the porous negative electrode layer of the negative electrode further contains carbon fibers having an aspect ratio of 10 to 10000.

7. The battery according to claim 1, wherein the positive electrode contains an active material selected from a lithium-manganese composite oxide, a lithium-nickel composite oxide, a lithium-cobalt composite oxide, a lithium-nickel-cobalt composite oxide, a lithium-manganese-nickel composite oxide, a spinel type lithium-manganese-nickel composite oxide, a lithium-manganese-cobalt composite oxide and lithium iron phosphate.

8. The battery according to claim 1, wherein the separator is a nonwoven fabric selected from a polyolefin, cellulose, a polyethylene phthalate and vinylon.

9. The battery according to claim 1, wherein the current collector in the negative electrode is made of an aluminum or an aluminum alloy.

10. The battery according to claim 9, wherein the current collector made of the aluminum or the aluminum alloy has an average crystal particle diameter of 50 μm or less.

11. The battery according to claim 1, wherein the at least one electrolytic salt is LiPF$_6$ or LiBF$_4$, and the at least one non-aqueous solvent is γ-butyrolactone.

* * * * *